Figure 3:
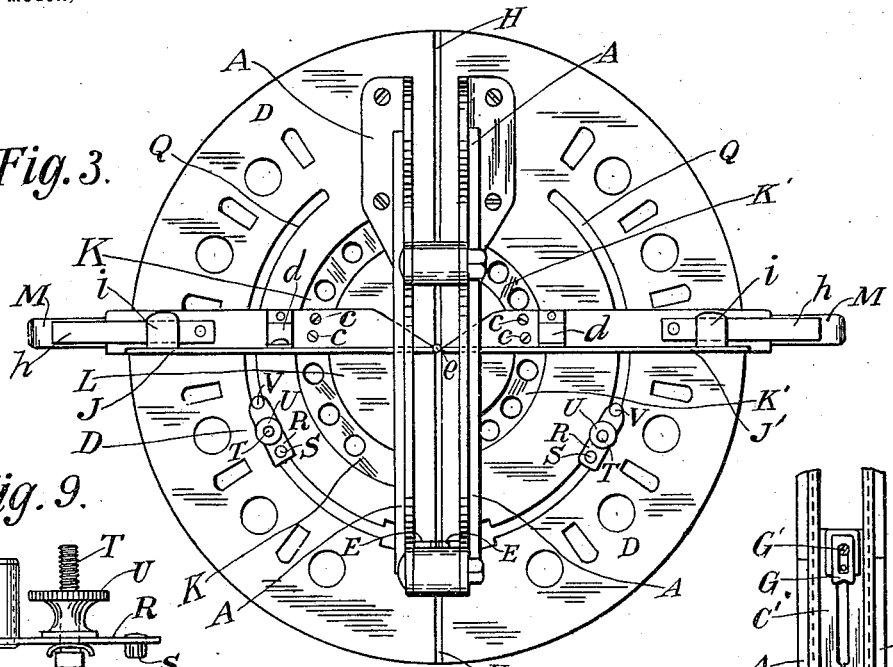

No. 651,457.
R. H. DORN.
MITER BOX.
(Application filed Jan. 30, 1900.)
Patented June 12, 1900.
(No Model.)
2 Sheets—Sheet 1.
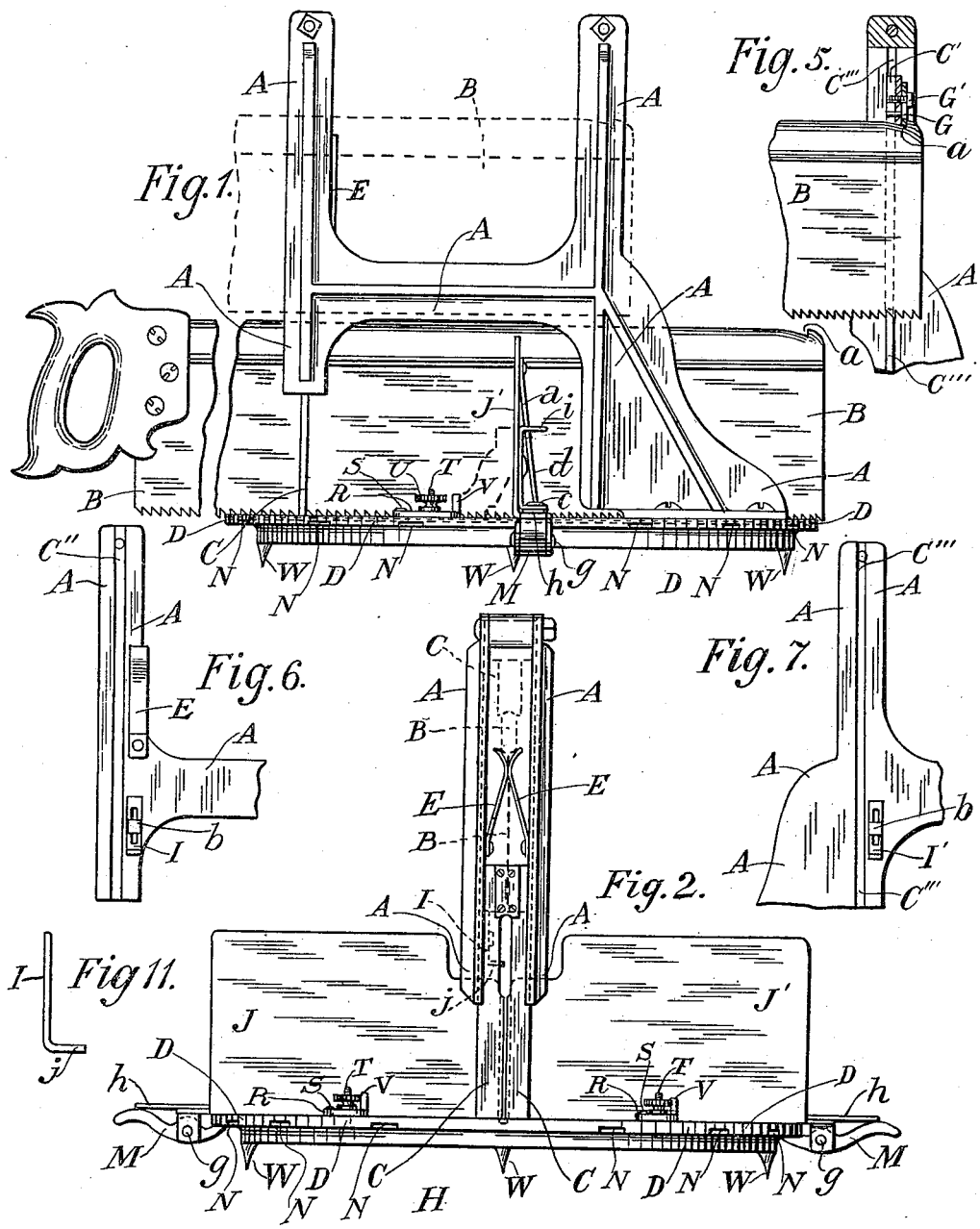
Witnesses
P. W. Pierce
S. O. Wood
Inventor
Rufus Herrick Dorn.
By St. John Day.
Attorney No. 651,457. Patented June 12, 1900.
R. H. DORN.
MITER BOX.
(Application filed Jan. 30, 1900.)
(No Model.) 2 Sheets—Sheet 2.

Witnesses
B. W. Pierce
S. O. Hood

Inventor
Rufus Herrick Dorn
By St John Day
Attorney.

UNITED STATES PATENT OFFICE.

RUFUS HERRICK DORN, OF LOS ANGELES, CALIFORNIA.

MITER-BOX.

SPECIFICATION forming part of Letters Patent No. 651,457, dated June 12, 1900.

Application filed January 30, 1900. Serial No. 3,380. (No model.)

*To all whom it may concern:*

Be it known that I, RUFUS HERRICK DORN, a citizen of the United States, and a resident of the city of Los Angeles, in the county of Los Angeles and State of California, have invented certain new and useful Improvements in Miter-Boxes, of which the following is a full, clear, and exact description or specification, reference being had to the annexed sheets of drawings and to the letters marked thereon.

My invention, which relates to certain new and useful improvements in miter-boxes, has mainly for its object to enable a much larger range of angles than is capable in or with boxes of the kind in general use to be cut on wood, such as molding or other forms of wood or timber which have to be joined by angular joints, so as to form structures in wood of every variety of angular form. This object is effected by constructing the vertical back of the miter-box in two movable portions meeting or nearly meeting at a central point or line and carried upon rotatable connections whose center of rotation is the same as that whereat the two portions of the back of the miter-boxes meet or nearly meet. This arrangement enables the two halves of the back of the miter-box to be placed either in a straight line, as in miter-boxes with fixed backs as hitherto constructed, while it also enables each half or division of the back of the miter-box to be moved to almost every angle in the entire range of a circle, so as to enable a cut to be made upon such corresponding angle into or upon any piece of molding or lumber placed in the miter-box.

In my improved miter-box the saw for cutting molding or other pieces of timber or lumber to the angle required is held in vertical slides and guides which in respect of their direction relatively with the table of the miter-box is a fixed one—that is to say, extending diametrically across the box and at right angles to the plane of the two halves constituting the back of the miter-box when these two halves are in line with each other at right angles to the plane of the saw—in place of the saw being carried in or by guides held in a radial bar movable through the limits of the angle determined by the angular opening in the table of the miter-box as hitherto constructed.

My improved miter-box contains many other features of improvement not contained in miter-boxes as hitherto constructed and which are hereinafter explained in reference to the drawings.

Figure 9:
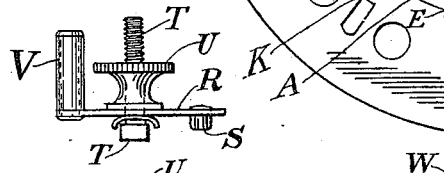
Figure 8:
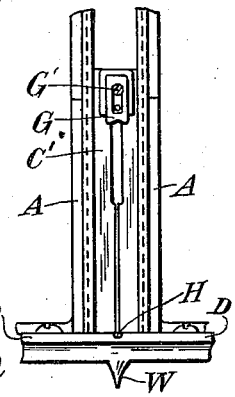
Figures 4, 10:
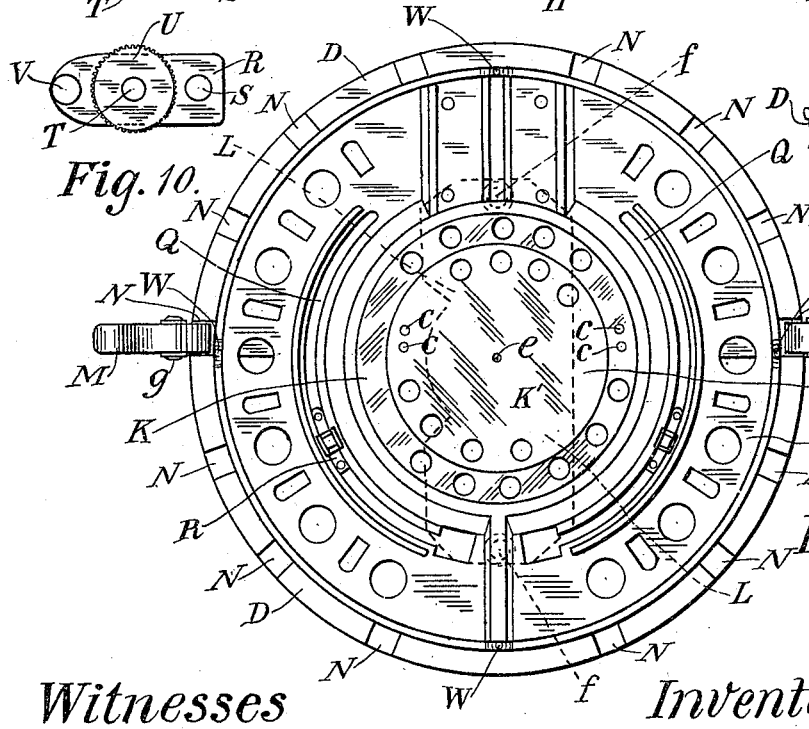

On the annexed drawings, Figure 1 is a side elevation of my improved miter-box with the saw shown therein and in its lowest position, the dotted line indicating a higher position of the saw. Fig. 2 is an end elevation of my improved miter-box, corresponding to Fig. 1, without the saw being shown. Fig. 3 is a plan of my improved miter-box corresponding to Figs. 1 and 2. Fig. 4 is an inverted plan of the under side of the miter-box, showing the construction thereof as hereinafter explained. Fig. 5 is a part end elevation of the back saw used in my improved miter-box, the guide through which it passes, and the retaining device in section for preventing the saw from being accidentally drawn out of the miter-box. Fig. 6 is an elevation of the inside of the front portion of the framing which carries the saw, guides, and attachments for operating in connection with the saw-guides. Fig. 7 is an elevation of the interior of the framing at the opposite end or rear thereof, showing the slide for the rear saw-guide and attachment. Fig. 8 is an end elevation of the rear saw-guide and the attachment hereinafter described. Fig. 9 is an elevation of one of the stops for maintaining the molding or other piece of timber in position when being cut to an angular joint. Fig. 10 is a plan of Fig. 9. Fig. 11 is a detail hereinafter described.

In Figs. 1, 2, and 3 the framing of the miter-box wherein the saw is carried is marked A, the saw itself being marked B. The framing A is so constructed at the front portion thereof, near the saw B, that when the saw B is raised upward to the position shown in dotted lines in Fig. 1, together with the front saw-guide C, this leaves the space between the lower portion of the framing A and the top of the table D free or unobstructed, so that any piece of wood or molding required to be cut can be pushed in under the saw from the front of the miter-box. For the purpose of holding the saw B in an upraised position while placing the material to be cut on the table of the miter-box the front part of the framing A A is provided with two springs E E, Figs. 1, 2, 3, and 6, which as the back of the saw B is lifted up between the springs E E causes the springs E E to yield outward, and immediately that the back of the saw has been passed upward through the upper part of these springs these springs E E close again against the blade of the saw and in the manner or way of the upraised position shown in the dotted lines at Fig. 2. The springs E E are applied to the front part of the framing A A only, and the corresponding rear part of the framing A A, with its saw-guide C, is provided with the drop-catch G, carried upon a stud or screw G', which passes through a slot in the drop-catch G, as seen at Fig. 5. The object of this drop-catch is that it may fall into the notch $a$, formed upon the outer end of this saw-back, as shown at Figs. 1 and 5. The drop-catch G always bears by the action of gravity upon the upper edge of the saw-back, and when the notch $a$ comes beneath it by the action of pulling the saw outward then the drop-catch descends by its own weight into the notch $a$, thereby preventing the saw from being pulled out of the miter-box while the saw is raised to its highest position—that is to say, in the position where the outer end part of its back rests upon the upper ends of the springs E E. Then the weight of the outer part of the saw resting upon the springs E E presses the other end of the saw up against the upper part of the slot of the rear saw-guide C, while the drop-catch G is engaged with the notch $a$, thereby maintaining the saw by the action of gravity in a position that it cannot be drawn out of the frame of the miter-box excepting when it is required to remove the saw, which is done by removing the drop-catch G entirely out of the notch $a$ by lifting the drop-catch by the finger out of contact with the saw-back.

For the purpose of preventing the teeth of the saw B from coming in contact with the table D, upon which the molding or other wood to be sawed is carried, the table is constructed with the groove H, Figs. 2 and 3, of sufficient depth to allow the teeth of the saw to cut completely through the wood without its teeth touching the metal of which the table D is constructed. The device for preventing the saw B from descending far enough for its teeth to come in contact with the bottom of the groove H consists of the two adjustable rests I and I' in the front and rear upright parts of the framing A A, respectively. These rests I and I' are more particularly shown in detail in Figs. 6 and 7 and separately and enlarged in side elevation at Fig. 11, and these each consist of a flat plate with a slot in it through which a set-screw $b$ passes, the bottom of each plate I I' having a toe projecting inward, as shown at Fig. 11, and one of which is shown in dotted lines at Fig. 2 and in edge elevation at Fig. 11, while each of these rests I and I' is shown at Figs. 6 and 7. These rests I and I' are at opposite sides of the framing and at alternate ends thereof, so that the under side of one half of the back of the saw B bears upon the toe of one of these rests I and the under side of the other half of the back of the saw B bears upon the toe of the other rest I'. According to the height at which these rests I and I' are adjusted by the tightening-screws $b$, so the depth to which the teeth of the saw will descend may from time to time be adjusted so as to cut either completely through the molding or other piece of timber placed in the miter-box to be cut or to cut to any required depth in said molding or timber.

The front and back saw-guides C C and C' C' are carried in parallel slides C'' and C''' in the front and rear upright parts of the framing A A, as shown in the drawings, so that they may move freely upward and downward as the saw B is raised and lowered in the framing of the miter-box.

The table D of the miter-box is circular, as shown at Figs. 1, 2, 3, and 4, and the two portions J and J', constituting the movable back of the said table, are attached to the circular ring K and plate K', respectively. (Shown in plan at Fig. 3 and in inverted plan at Fig. 4.) The portions J and J', constituting this back, are fastened to the circular ring and disk K and K', respectively, by screws $c\ c$, Figs. 1, 3, and 4, and the backs J and J' are further made rigid by the inclined supports $d$ of the back J and J', as shown more particularly at Figs. 1 and 3. The circular ring K and the circular plate K' are well fitted in the recess in the under side of the table D, as shown at Fig. 4, and the two portions constituting the back J and J' being attached to the ring K and plate K', respectively, are capable of being rotated with the ring K and the plate K', respectively, and independently of each other around the axis or center of the miter-box, (indicated by the circle $e$, Figs. 3 and 4.) The ring K and the disk K' in the recess in the under side of the table D are both held therein by the plate L, (shown in dotted lines in Fig. 4,) which plate is attached across the under side of the table D and held there by the screws $f$, thereby retaining the ring K and the plate K', together with their attachments, consisting of the back J and J', each in their operating condition—that is to say, so that the ring K, with its back J, and the plate or disk K' and its back J', may be moved into any required angular position relatively with the fixed transverse position of the saw B. Each half of the back J and J' is furnished with the spring retaining-catch M and mounted upon a pivot $g$, carried in a bracket extending from the rear of each division of the back J and J', as shown more particularly at Figs. 2 and 4. A spring $h$ presses upon the outer end of each retaining-catch M, thereby forcing the inner end of the retaining-catch M up into any one of the recesses N, Figs. 1, 2, and 4, which recesses N are arranged at the under side of the table D, as shown in the drawings, in such positions as correspond generally to the angles of position of the back K and K', usually employed for cutting molding or other timber to be jointed. The rear of each portion J and J' of the removable back is provided with the rest $i$ for placing the thumb upon when it is desired to lift the inner end of the retaining-catch M from out of any one of the recesses N in the under side of the table D, which is effected at any time by placing the forefinger under the outer end of the retaining-catch M and lifting the said retaining-catch upward upon and around the pivot $g$, so that when the retaining-catch M is released from any one of the recesses N the corresponding portion of the back J and J' is free to be moved around to any other recess N, corresponding to the angle to which the molding or timber is required to be cut, so that by means of this arrangement the two portions of the back J and J', respectively, are readily placed at any required angle with each other.

In Fig. 1 a piece of molding held against the back J' and resting upon the table D is shown in dotted lines, and for the purpose of maintaining the molding continuously in the requisite position while its angle is being cut by the saw B two movable stops are provided, each being fitted into a circular groove Q. The construction of these stops will be better explained by reference to Figs. 9 and 10, which show them to consist of a flat base R, in one end of which is a cylindrical stop V and in the center of which is a pinching-screw T, whose head is at the under side and beneath the groove Q and whose screw is at the upper side and upon which the thumb-nut U is situated, by screwing which downward upon the table D the stop is held in any required position in the groove Q, so that the cylindrical upright front portion V bears against the lower edge of the molding, thereby maintaining it in position, as shown at dotted lines in Fig. 1.

The under side of the table D is constructed with three or four (more or less) sharp feet W W, so that by the weight of the miter-box these feet enter or press into the wood of the bench or other support upon which the miter-box is placed, thereby avoiding the necessity of having the miter-box screwed down to the bench or other place where it is used for being operated with.

From the drawings it will be seen that the table D and the ring K, also disk K', have holes formed through them in order that the sawdust produced in the act of sawing the joints of molding or other timber cut in the miter-box may fall or be swept through said holes, and thereby prevented from clogging the movable backs J and J' and the ring K and plate K', to which they are respectively connected.

Having now described the nature of my said invention and the best system, mode, or manner I am at present acquainted with for carrying the same into practical effect, I desire to observe in conclusion that what I consider to be novel and original, and therefore claim as the invention to be secured to me by Letters Patent, is as follows:

1. In a miter-box the circular table having a recess at the center of its under side for containing the disk and ring to which the movable and adjustable halves of the back are attached, and the plate attached to the under side of the table for retaining said disk and ring in said recess, the circular openings through which the connections of the movable halves of the back respectively pass, thereby enabling the said halves of the back and the movable disk and ring to be moved around their axis, the adjustable stops and with grooves for carrying the adjustable stops, substantially as hereinbefore described.

2. The miter-box consisting of a circular table, the saw-guide-carrying frame attached to the rear of said table, having the saw-carrying parts of this framing projecting horizontally across and vertically upward above the table to the front thereof, so that the saw and saw-guide when raised into the upper parts of the frame, and retained in that position, leave the space between the horizontal member of the framing and the table unobstructed, the retaining-springs for holding the saw and saw-guides in this unobstructing position, the rests at the front and rear parts of the framing on which the saw-back rests in the lowest position thereof, the notch in the outer end of the saw-back, the drop-catch entering said notch, the radially, that is to say angularly, adjustable back of the miter-box, substantially as hereinbefore described.

3. The miter-box consisting of the circular table, the saw-guide-carrying frame projecting horizontally across and vertically upward above the table, the grooves in said frame for the saw-guides, the saw-guides, the saw, the retaining-springs, the saw-rests, the notch in the outer upper end of the saw-back, the drop-catch, the radially, that is to say angularly, adjustable back of the box, the ring and plate to which the angularly-adjustable backs of the miter-box are respectively connected, substantially as hereinbefore described.

4. The miter-box consisting of the circular table, the saw-guide-carrying frame projecting horizontally across and vertically upward above the table, the grooves in said frame for the saw-guides, the saw-guides, the saw, the retaining-springs, the saw-rests, the notch in the outer upper end of the saw-back, the drop-catch, the radially, that is to say angularly, adjustable back of the box, the ring and plate to which the angularly-adjustable backs of the miter-box are respectively connected, the spring-catch devices and recesses in the table with which said spring-catch devices engage and are disengaged from for adjusting the angular positions of the two portions of the movable back, substantially as hereinbefore described.

5. The miter-box consisting of the circular table, the saw-guide-carrying frame projecting horizontally across and vertically upward above the table, the grooves in said frame for the saw-guides, the saw-guides, the saw, the retaining-springs, the saw-rests, the notch in the outer upper end of the saw-back, the drop-catch, the radially, that is to say angularly, adjustable back of the box, the ring and plate to which the angularly-adjustable backs of the miter-box are respectively connected, the spring-catch devices and recesses in the table with which said spring-catch devices engage and are disengaged from for adjusting the angular positions of the two portions of the movable back, the recesses at the center of the under side of the table, the ring and disk contained in said recess, the grooves for containing the adjustable stops and the adjustable stops operating in said circular slots in the table, substantially as hereinbefore described.

In testimony whereof I have hereunto set my hand, in the presence of two subscribing witnesses, this 21st day of December, 1899.

RUFUS HERRICK DORN.

Witnesses:
  ST. JOHN DAY,
  ARTHUR BULL.